United States Patent
Bozintan

(10) Patent No.: US 12,214,700 B2
(45) Date of Patent: Feb. 4, 2025

(54) LONGITUDINAL ADJUSTER FOR A SEAT AND SEAT

(71) Applicant: ADIENT ENGINEERING AND IP GMBH, Burscheid (DE)

(72) Inventor: Vasile Emil Bozintan, Farmington Hills, MI (US)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 606 days.

(21) Appl. No.: 17/277,348

(22) PCT Filed: Sep. 12, 2019

(86) PCT No.: PCT/EP2019/074393
§ 371 (c)(1),
(2) Date: Mar. 18, 2021

(87) PCT Pub. No.: WO2020/064358
PCT Pub. Date: Apr. 2, 2020

(65) Prior Publication Data
US 2021/0347282 A1    Nov. 11, 2021

Related U.S. Application Data

(60) Provisional application No. 62/735,204, filed on Sep. 24, 2018.

(51) Int. Cl.
*B60N 2/08* (2006.01)
*B60N 2/06* (2006.01)
(Continued)

(52) U.S. Cl.
CPC ........... *B60N 2/0818* (2013.01); *B60N 2/067* (2013.01); *B60N 2/0705* (2013.01);
(Continued)

(58) Field of Classification Search
CPC .. B60N 2/0818; B60N 2/0875; B60N 2/0881; B60N 2/12; B60N 2002/924
See application file for complete search history.

(56) References Cited

U.S. PATENT DOCUMENTS 5,732,923 A * 3/1998 Tame .................. B60N 2/4214
248/430
6,216,995 B1   4/2001 Koester
(Continued)

FOREIGN PATENT DOCUMENTS

DE      102015204273 A1   9/2016
FR          3043954 A1    5/2017
(Continued)

OTHER PUBLICATIONS

PCT International Search Report and Written Opinion (PCT/EP2019/074393).
(Continued)

*Primary Examiner* — David R Dunn
*Assistant Examiner* — Tania Abraham
(74) *Attorney, Agent, or Firm* — Marshall & Melhorn, LLC

(57) ABSTRACT

A longitudinal adjuster for a seat, in particular vehicle seat, may have at least a fixed lower track and an upper track slidable coupled to the lower track, an adjustment device for longitudinally adjusting the upper track relative to the lower track, a latch mechanism to latch the upper track relative to the lower track, and an electromechanical device relatively coupled to the latch mechanism. The electromechanical device may be configured to bias the latch mechanism between a release position and a latch position, and upon release of the latch mechanism the adjustment device is actuated to drive the upper track relative to the lower track.

17 Claims, 5 Drawing Sheets

(51) Int. Cl.
 *B60N 2/07*   (2006.01)
 *B60N 2/90*   (2018.01)
(52) U.S. Cl.
 CPC ......... *B60N 2/0875* (2013.01); *B60N 2/0881*
  (2013.01); *B60N 2002/924* (2018.02)

(56) References Cited

U.S. PATENT DOCUMENTS

| | | | |
|---|---|---|---|
| 2004/0164218 A1 | 8/2004 | Yokota | |
| 2006/0226328 A1* | 10/2006 | Matsumoto | B60N 2/0843 |
| | | | 248/429 |
| 2006/0231719 A1 | 10/2006 | Kayumi | |
| 2007/0013218 A1 | 1/2007 | Kayumi | |
| 2008/0023613 A1* | 1/2008 | Brewer | B60N 2/067 |
| | | | 296/65.01 |
| 2009/0230275 A1 | 9/2009 | Lawall | |
| 2009/0289485 A1* | 11/2009 | Walter | B60N 2/0875 |
| | | | 297/344.1 |
| 2010/0026283 A1* | 2/2010 | Nishide | B60R 21/01554 |
| | | | 324/207.26 |
| 2016/0114703 A1* | 4/2016 | Fujita | B60N 2/165 |
| | | | 248/550 |
| 2018/0037140 A1 | 2/2018 | Gollhardt et al. | |
| 2019/0184859 A1* | 6/2019 | Flick | B60N 2/0818 |

FOREIGN PATENT DOCUMENTS

| | | |
|---|---|---|
| JP | 2004243811 A | 9/2004 |
| JP | 2006205756 A | 8/2006 |
| JP | 2006 347514 A | 12/2006 |
| JP | 2007022272 A | 2/2007 |
| JP | 2015116833 A | 6/2015 |

OTHER PUBLICATIONS

Japan Patent Office, Office Action in Application No. JP 2021-516383, dated Jul. 5, 2022, 17 pages.

* cited by examiner

LONGITUDINAL ADJUSTER FOR A SEAT AND SEAT

BACKGROUND

The present disclosure relates generally to a longitudinal adjuster for a seat, in particular vehicle seat. Particularly, the longitudinal adjuster is configured to adjust the seat for easy-entry. Further, the present disclosure relates to a seat with such a longitudinal adjuster.

Longitudinal adjusters for seats are known from the prior art, wherein the longitudinal adjusters comprise track mechanisms having at least a lower track fixed to a vehicle bottom and an upper track slidable coupled to the lower track.

Various easy-entry systems are known which are part of a vehicle seat to permit easier access into a second seat row of a vehicle.

SUMMARY

It is an object of the present disclosure to provide an improved longitudinal adjuster for a seat, in particular vehicle seat. Further, it is an object of the present disclosure to provide an improved seat having such a longitudinal adjuster, in particular providing an easy-entry function.

According to the longitudinal adjuster, the object is solved by the claimed features. According to the seat, in particular vehicle seat, the object is solved by the claimed features.

According to the disclosure, a longitudinal adjuster for a seat, in particular vehicle seat, comprises at least: a fixed lower track and an upper track slidable coupled to the lower track, a latch mechanism to latch the upper track relative to the lower track, and an adjustment device for longitudinally adjusting the upper track relative to the lower track. Further, the longitudinal adjuster comprises an electromechanical device which is relatively coupled to the latch mechanism, wherein the electromechanical device is configured to bias the latch mechanism between a release position and a latch position, and wherein upon release of the latch mechanism the adjustment device is actuated to drive the upper track relative to the lower track. In particular, the adjustment device drives the upper track forth and back. For instance, the longitudinal adjuster is configured to move the seat from a used position, particularly a sitting and/or comfort position, to an easy-entry position providing easy access to a rear of the seat. In particular, the upper track is electrically driven by the adjustment device when the latch mechanism is in the release position.

With the present invention a functionality in order to reduce efforts of returning from an easy-entry position back to the use position is achieved. In particular, efforts to return the seat from the easy-entry position back to a locked position are reduced.

Further, the present invention allows a substantially automated adjustment of the upper track relative to the lower track from one position to another. A manual adjustment of the seat, for example pushing or pulling the seat from one position to another after manually releasing the latch mechanism, is not required.

Moreover, the present invention allows high level functionality and high performance, such as high speed powered rearward motion of the seat, for example from the easy-entry position, combined with low cost and relative lightweight components.

For example, the electromechanical device is configured as a solenoid having at least one electromagnetic actuator to bias the latch mechanism in one direction and at least one spring element to bias the latch mechanism in an opposite direction. Particularly, use of the electromechanical device enables reduced components to actuate the latch mechanism and required installation space. Further, utilization of such an electromechanical device enables a substantially simplified self-acting adjustment of the latch mechanism without any external, user applied manual force. Depending on a linear movement of the electromagnetic actuator when power is applied, the spring element is either a pressure spring or a tension spring to bias the latch mechanism in one of an opposite direction, when power is interrupted.

It is understood, that a biasing force initiated by an electromechanical device is, for example, a pull or push force.

According to an embodiment, the electromagnetic actuator is configured to bias, i.e. push or pull the latch mechanism from the latch position to the release position or vice versa, particularly when power is applied. The spring element is configured to bias, i.e. pull or push the latch mechanism from the release position to the latch position or vice versa, particularly when power is interrupted.

For example, if the electromechanical device is configured to release the latch mechanism when power, particularly electrical power/current, is applied, the electromechanical device is in one of an active state. In the active state, the electromechanical device biases the latch mechanism from the latch position to the release position. Therefore, the electromechanical device is configured to lock the latch mechanism when no power is applied, for instance when power supply is switched off. That means the electromechanical device is in one of a passive state. In this case, the electromechanical device is configured as an on-off solenoid, wherein when power is applied the electromagnetic actuator pushes or pulls the latch mechanism from one position to another and when no power is applied, the electromagnetic actuator is released such that the spring element is enabled to push or pull the latch mechanism from one position to another.

Optionally, the electromechanical device is configured as a locking solenoid which holds the latch mechanism in a fixed position without a constant source of power. For instance, by applying a temporary current of one polarity to the electromagnetic actuator causes the electromagnetic actuator to bias the latch mechanism from one position to another and to hold the latch mechanism in one position till a temporary current with opposite polarity is applied to the electromechanical device. This current cancels the magnetic force of the electromagnetic actuator, allowing the spring element to bias the latch mechanism to an opposite position.

According to a possible embodiment, the electromechanical device is configured to bias the latch mechanism from the release position back to the latch position when the latch mechanism and/or the upper track arrive/s at a designated position. In particular, the electromechanical device is configured to bias the latch mechanism from the release position back to the latch position in a self-acting manner.

For instance, a designated position, for example a front position for easy-entry, is indicated by an end stop arranged in a front region of the tracks. When the released latch mechanism and/or the upper track come/s in contact with the end stop, the applied power to the electromechanical device is switched off or rather interrupted.

Further, a designated position, for example a rear position, particularly an initial position, such as the use or comfort position of the seat, is a predefined position which will be communicated to a power supply of the electromechanical device. For example, when the latch mechanism reaches the predefined designated position, the applied power to the electromechanical device is switched off or rather interrupted. For instance, the predefined and designated rear position is a position in front of the latch position. Thereafter, the electromechanical device is enabled to bias the latch mechanism to the latch position when a force biasing the latch mechanism in the release position is switched off.

Furthermore, the electromechanical device is configured to communicate with a control unit having a number of sensors. The control unit transmits received signals of the sensors to activate or deactivate the electromechanical device, particularly to apply or interrupt power to the electromagnetic actuator.

According to another embodiment, the adjustment device is configured to stop driving when the latch mechanism and/or the upper track arrive/s at an end stop position. For example, the adjustment device stops driving when the latch mechanism is positioned, particularly locked, in its defined latch position. Thereby, the latch mechanism and so the upper track is in the end stop position. A signal to stop driving of the adjustment device can be initiated after detecting an experienced increased resistance of the adjustment device.

For instance, an end stop position, for example a front end stop position for easy-entry, is indicated by an end stop arranged in a front region of the tracks. When the released latch mechanism and/or the upper track come/s in contact with the end stop, the adjustment device stops driving. Further, when the adjustment device stops driving the electromechanical device biases the latch mechanism from the release position to a latch position.

To activate a rearward movement of the upper track, particularly from the front end stop position back to a rear end stop position, particularly use and comfort position, the user can operate an operating element and/or exert a force on the seat. For instance, when the control unit detects a force acted on the seat, for example on a seat pan or backrest of the seat, towards a rearward direction, the electromechanical device is actuated to bias the latch mechanism from the latch position to the release position, whereas the adjustment device is switched on to electrically reverse drive the upper track relative to the lower track.

In other words: The rear end stop position is communicated to the adjustment device upon detecting the latch mechanism in the latch position. The front end stop position can be communicated to the adjustment device upon detecting an increased resistance affecting on the adjustment device and/or upon detecting a contact between the end stop and the latch mechanism and/or the upper track.

For this purpose, the adjustment device is configured to communicate with the control unit having a number of sensors. Moreover, a switching of the electromechanical device and the adjustment device can be initiated dependent from each other. Thus, a fluent switchover of different states of the electromechanical device and the adjustment device is ensured.

According to a further embodiment, the electromechanical device is actuatable via an operating element. For instance, the operating element is arranged within a vehicle, for example in a dashboard area or a rear compartment area, and/or on the corresponding seat. Thereby, the operating element can be one of a button, a lever, a switch or any other operable element. In particular, by operating the operating element the electromechanical device receives a signal to bias the latch mechanism from the latch position to the release position. Upon release of the latch mechanism, the adjustment device receives a signal that the latch mechanism is released such that the upper track is in a slidable state. Thereafter, the adjustment device is actuated to drive the upper track relative to the lower track, in particular in a forward direction or rearward direction.

For instance, the latch mechanism is a common latch mechanism. The latch mechanism is arranged substantially within a track profile formed by the lower track and the upper track. In particular, the lower track and the upper track are formed such that they engage alternately around each other forming the track profile.

For example, the latch mechanism is formed as a latch plate or a latch lever, pawl or catch. The latch mechanism comprises a number of latching elements, for example projecting elements, such as teeth elements, which project from the latch plate. The projecting elements project through openings formed in the upper track. Further, to latch the upper track to the lower track, the projecting elements protrude into apertures formed in the lower track. In particular, the latch mechanism is arranged movable within the track profile. By moving the latch mechanism, for instance in a vertical manner, the projecting elements are released from the apertures of the lower track. Thereby, the upper track is slidable relative to the lower track.

In another embodiment, the electromechanical device is arranged on the upper track and is directly coupled to the latch mechanism. For instance, the electromechanical device is arranged on a top surface of the upper track above the latch mechanism. The latch mechanism comprises an actuating pin, rod or bolt. The actuating pin is guided through a top opening formed in the top surface of the upper track, wherein the actuating pin is connected to the electromechanical device and so connected to the upper track. By actuating the electromechanical device, such as a solenoid, a plunger of the electromechanical device is biased in a vertical manner by electromagnetic force while simultaneously biasing the actuating pin of the latch mechanism to lock or unlock the latch mechanism relative to the lower track.

According to another possible embodiment, the electromechanical device is arranged distanced from the upper track, wherein the electromechanical device is coupled to the latch mechanism via a towel bar. Depending on an assembly space underneath the seat, an arrangement of the electromechanical device is variable adaptable. In particular, by arranging the electromechanical device distanced from the upper track, an overall package is improved. Further, by connecting the electromechanical device and the latch mechanism via the towel bar, a dual activation function is enabled.

In a further embodiment, the adjustment device is configured as an external transmission device. In particular, the upper track will be disconnected from the lower track by using the electromechanical device, particularly the electromagnetic actuator, and following, the movement of the upper track is actuated by the external transmission with the adjustment device.

According another embodiment, the adjustment device comprises a rack and pinion drive arranged at least partially along a length of the tracks. This ensures a substantially simplified power activation of, for example, second row seats from the use and comfort position to the easy-entry position and from the easy-entry position backward to the locked, use and comfort position.

Another embodiment is provided, wherein the rack and pinion drive comprises at least a toothed rack which is relatively fixed to the lower track and a pinion which is relatively fixed to the upper track. For instance, the toothed rack extends at least partially along a length of the lower track. In particular, the toothed rack is arranged extending substantially parallel to side portions of the tracks. The pinion is power driven, engaging the toothed rack to move along in a longitudinal direction. Thereby, the upper track is moved by the powered movement of the pinion. For instance, the upper track will be disconnected from the lower track by using the electromechanical device, particularly the electromagnetic actuator, followed by an external transmission with interaction of the pinion and rack.

According to a further embodiment, the adjustment device comprises a driving unit, such as a motor, to power the rack and pinion drive upon release of the latch mechanism. For example, the driving unit is coupled to the control unit, whereas upon release of the latch mechanism, a signal is transmitted to the driving unit to start powering the rack and pinion drive for longitudinal movement of the upper track.

In another possible embodiment, the driving unit is relatively coupled to the upper track. For example, the driving unit is arranged on the top surface of the upper track. Optionally, the driving unit is arranged laterally distanced from the tracks. Particularly, the driving unit is coupled to the upper track via a bar, rod or the like. Depending on an assembly space, an arrangement of the driving unit is variable adaptable. For instance, the laterally arranged driving unit can be covered in an easy manner.

In a further possible embodiment, the adjustment device comprises a clutch unit to connect or disconnect the driving unit and the rack and pinion drive upon release or latching of the latch mechanism. For example, the clutch unit is arranged between the driving unit and the rack and pinion drive. In particular, the clutch unit connects or disconnects the driving unit to or from the pinion. In particular, the clutch unit is configured to connect or disconnect the driving unit and the rack and pinion drive, when power is applied or interrupted to actuate the electromechanical device.

Further, the present invention relates to a seat, in particular vehicle seat, comprising at least a seat pan, a backrest and a longitudinal adjuster according to any above described embodiments. In particular, the longitudinal adjuster is configured to move at least the seat pan to an easy-entry position.

In another embodiment, the backrest is movable relative to the seat pan while moving the seat pan to the easy-entry position and back to the use and comfort position.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION OF PREFERRED EMBODIMENTS

Figure 1A:
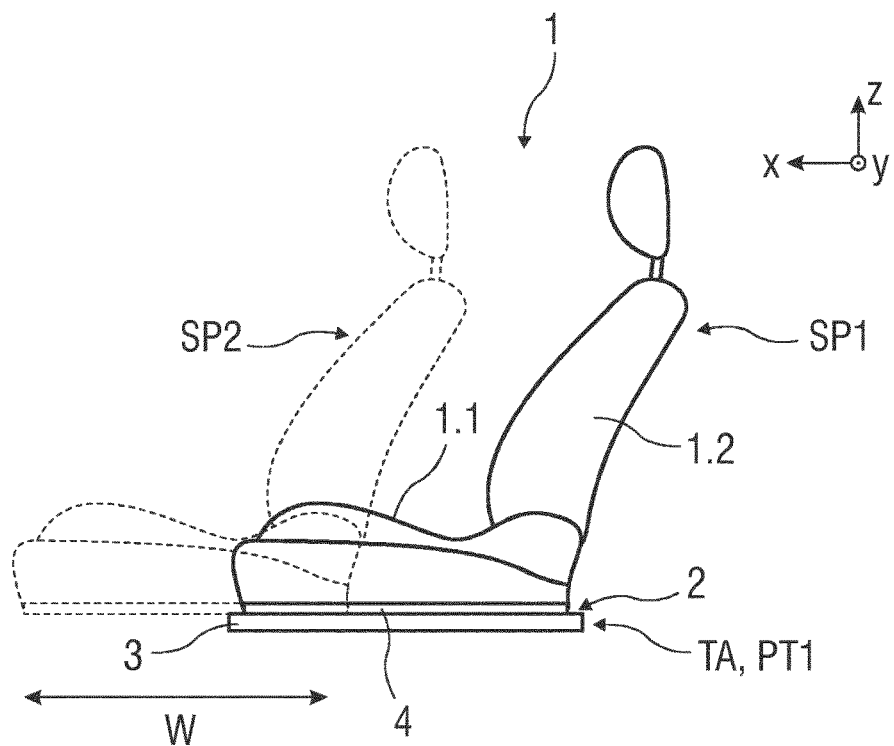
FIG. 1A shows a side view of an embodiment of a seat, in particular a vehicle seat, having a longitudinal adjuster.

FIG. 1A shows a side view of an embodiment of a seat 1, in particular a vehicle seat, having a longitudinal adjuster 2 having a track arrangement TA. The track arrangement TA comprises at least a pair of tracks PT1.

Figure 1B:
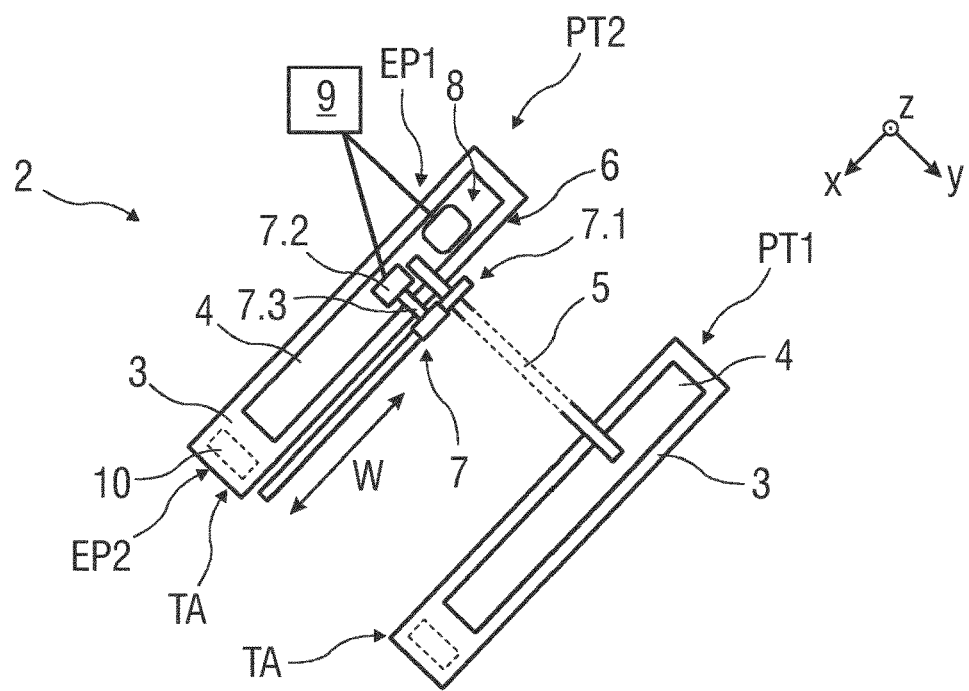
FIG. 1B shows a perspective view of an embodiment of a longitudinal adjuster, comprising two pair of tracks.

FIG. 1B shows a perspective view of an embodiment of the longitudinal adjuster 2, wherein the track arrangement TA comprises two pair of tracks PT1, PT2 arranged parallel to each other.

For a better understanding of subsequent descriptions of the seat 1 and the longitudinal adjuster 2 a coordinate system is shown in further figures. The coordinate system comprises a longitudinal axis x, a transverse axis y and a vertical axis z in relation to a vehicle. The seat 1 is at least positionable with respect to the longitudinal axis x.

The seat 1 comprises a seat pan 1.1 and a backrest 1.2 which is coupled to the seat pan 1.1. For instance, the backrest 1.2 is movable, particularly tiltable, with respect to the seat pan 1.1.

The seat 1 comprises an easy-entry function, wherein the seat pan 1.1 is, together with the backrest 1.2, arranged so as to be longitudinally displaceable by the longitudinal adjuster 2 along a travel path W at least between two positions SP1, SP2. In particular, the seat 1 is displaceable between a use and comfort position SP1 and an easy-entry position SP2. In the easy-entry position SP2, an easier access to second seat rows and/or rear compartment is permitted.

The longitudinal adjuster 2 is provided for longitudinal displacement of the seat 1 and comprises, as shown in FIG. 1B, two pair of tracks PT1, PT2. Each pair of tracks PT1, PT2 comprises two tracks 3, 4.

At least one of the pair of tracks PT1, PT2 comprises a first, lower track 3 and a second, upper track 4 which is slidable coupled to the lower track 3. The lower track 3 is fixed to a vehicle structure, such as a vehicle floor. In the shown embodiment, the upper track 4 is fixed to the seat pan 1.1 to move the seat pan 1.1 between the use and comfort position SP1 and the easy-entry position SP2.

For instance, the pairs of tracks PT1 and PT2 are arranged on each lateral side of the seat pan 1.1. Thereby, the pairs of tracks PT1, PT2 can be coupled to each other via a mounting rod 5 for simultaneous longitudinal movement of the seat 1 when at least one of the pairs of tracks PT1, PT2 is actuated for longitudinal movement.

Further, the longitudinal adjuster 2 comprises at least one latch mechanism 6 to latch the upper track 4 relative to the lower track 3.

Moreover, the longitudinal adjuster 2 comprises at least one adjustment device 7 for longitudinally adjusting the upper track 4 relative to the lower track 3.

For example, the latch mechanism 6 and the adjustment device 7 are arranged on one or both pairs of tracks PT1, PT2. In the shown embodiment, the latch mechanism 6 and the adjustment device 7 are arranged relatively coupled to one of the pairs of tracks PT1.

Figure 2A:
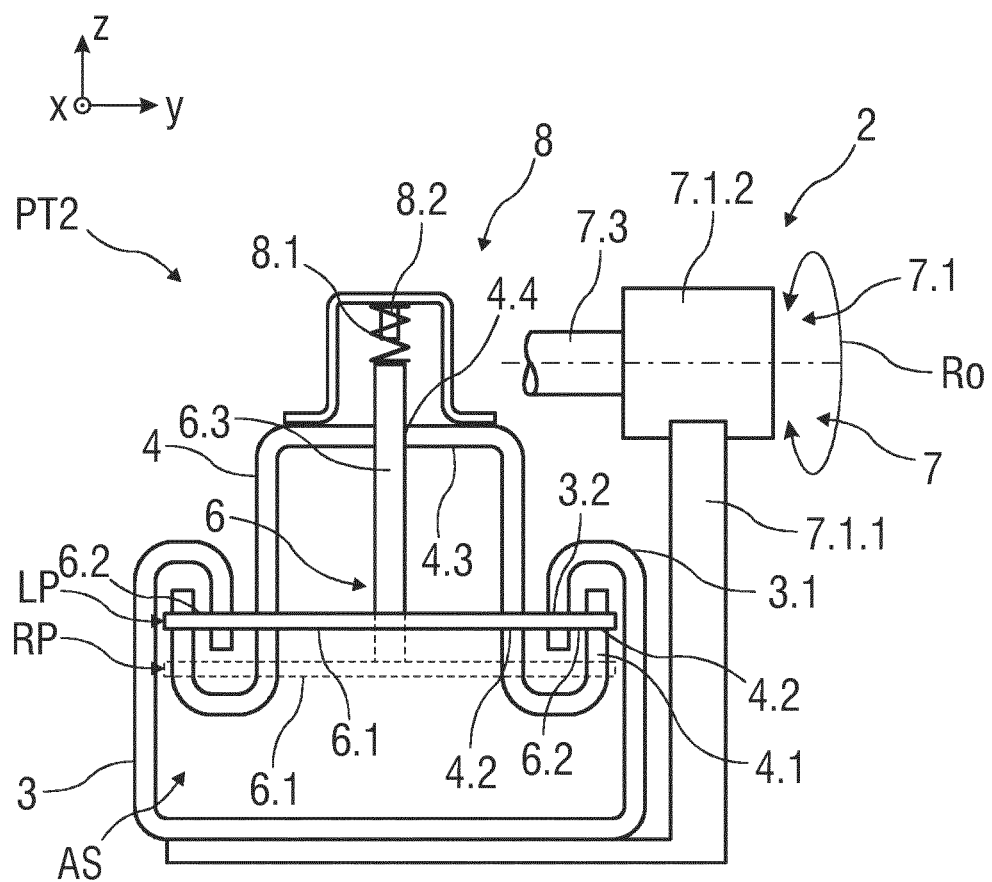
FIG. 2A shows a sectional view of at least a section of an embodiment of the longitudinal adjuster, particularly of one pair of tracks.

Furthermore, the longitudinal adjuster 2 comprises an electromechanical device 8 which is relatively coupled to the latch mechanism 6, wherein the electromechanical device 8 is configured to bias the latch mechanism 6 between a release position RP and a latch position LP, as shown in FIG. 2A, and upon release of the latch mechanism 6 the adjustment device 7 is actuated to drive the upper track 4 relative to the lower track 3 in a longitudinal direction.

For instance, the electromechanical device 8 is configured as a solenoid. For example, the electromechanical device 8 is actuated to bias the latch mechanism 6 from the release position RP to the latch position LP, when power or current is applied to the electromechanical device 8. This means that the electromechanical device 8 switches from a passive state, when no power or current is applied, to an active state, when power or current is applied, and vice versa. Thereby, the electromechanical device 8 is acting on the latch mechanism 6 in each of the states.

In the shown embodiments, in the passive state of the electromechanical device 8 the latch mechanism 6 is maintained in its latch position LP. In the active state of the electromechanical device 8 the latch mechanism 6 is maintained in its release position RP. In particular, the electromechanical device 8 prevents the latch mechanism 6 from moving to its release position RP or from moving to its latch position LP.

To communicate an initiation to actuate the adjustment device 7 as a function of a state of the electromechanical device 8, at least the adjustment device 7 and the electromechanical device 8 are coupled to a control unit 9, such as a sensor arrangement.

For example, the electromechanical device 8 is actuatable via a not further shown operating element. Therefore, the operating element can be coupled to electromechanical device 8 via the control unit 9. For instance, the operating element is arranged within a vehicle, for example in a dashboard area or a rear compartment area, and/or on the corresponding seat 1. Thereby, the operating element can be one of a button, a lever, a switch or any other operable element. In particular, by operating the operating element the electromechanical device 8 receives a signal to bias the latch mechanism 6 from the latch position LP to the release position RP. Upon release of the latch mechanism 6, the adjustment device 7 receives a signal that the latch mechanism 6 is released such that the upper track 4 is ready to be displaced. Thereafter, the adjustment device 7 is actuated to drive the upper track 4 relative to the lower track 3, in particular along the travel path W.

In particular, the adjustment device 7 is configured as an external transmission device of the tracks 3, 4. Thereby, the adjustment device 7 is substantially arranged outside a profile of the tracks 3, 4. For example, the adjustment device 7 is substantially arranged between the pairs of tracks PT1 and PT2.

According to an embodiment, the adjustment device 7 comprises a rack and pinion drive 7.1. In the shown embodiment, the rack and pinion drive 7.1 is arranged on a lateral side of the tracks 3, 4. The rack and pinion drive 7.1 is power driven. Therefore, the adjustment device 7 comprises a driving unit 7.2 which is configured to power the rack and pinion drive 7 for longitudinal movement.

Further, the adjustment device 7 comprises a clutch unit 7.3 to connect or disconnect the driving unit 7.2 and the rack and pinion drive 7.1 upon release or latching of the latch mechanism 6. For example, the clutch unit 7.3 is arranged between the driving unit 7.2 and the rack and pinion drive 7.1. In particular, the clutch unit 7.3 is configured to connect or disconnect the driving unit 7.2 and the rack and pinion drive 7.1, when power is applied or interrupted to actuate the electromechanical device 8.

For instance, the adjustment device 7 is configured to stop driving when the latch mechanism 6 arrives at an end stop position EP1, EP2. Additionally or optionally, the adjustment device 7 is configured to stop driving when the upper track 4 arrives at a detected end stop position EP1, EP2. For example, the adjustment device 7 stops driving when the latch mechanism 6 is positioned, particularly locked, in its defined latch position LP. Thereby, the latch mechanism 6 and so the upper track 4 is in the end stop position EP1 or EP2. A signal to stop driving of the adjustment device 7 can be initiated after detecting an experienced increased resistance of the adjustment device 7 and/or upon detecting the latch mechanism 6 and/or the upper track 4 in a defined end stop position EP1 or EP2.

An end stop position EP1, for example a rear end stop position corresponding to the use and comfort position SP1 of the seat 1, is indicated by the latch position LP of the latch mechanism 6. Upon detecting the latch mechanism 6 being in the latch position LP, the adjustment device 7 stops driving.

A front end stop position EP2, for example a front end stop position corresponding to the easy-entry position SP2 of the seat 1, is indicated by an end stop 10 arranged in a front region of the tracks 3, 4. When the released latch mechanism 6 comes in contact with the end stop 10 the adjustment device 7 stops driving.

Additionally or optionally, the upper track 4 comprises a corresponding end stop portion, wherein when the corresponding end stop portion comes in contact with the end stop 10, the adjustment device 7 stops driving. For example, the corresponding end stop portion of the upper track 4 is formed as a flap, tab or bracket element arranged in a rear region of the upper track 4.

Figure 2B:
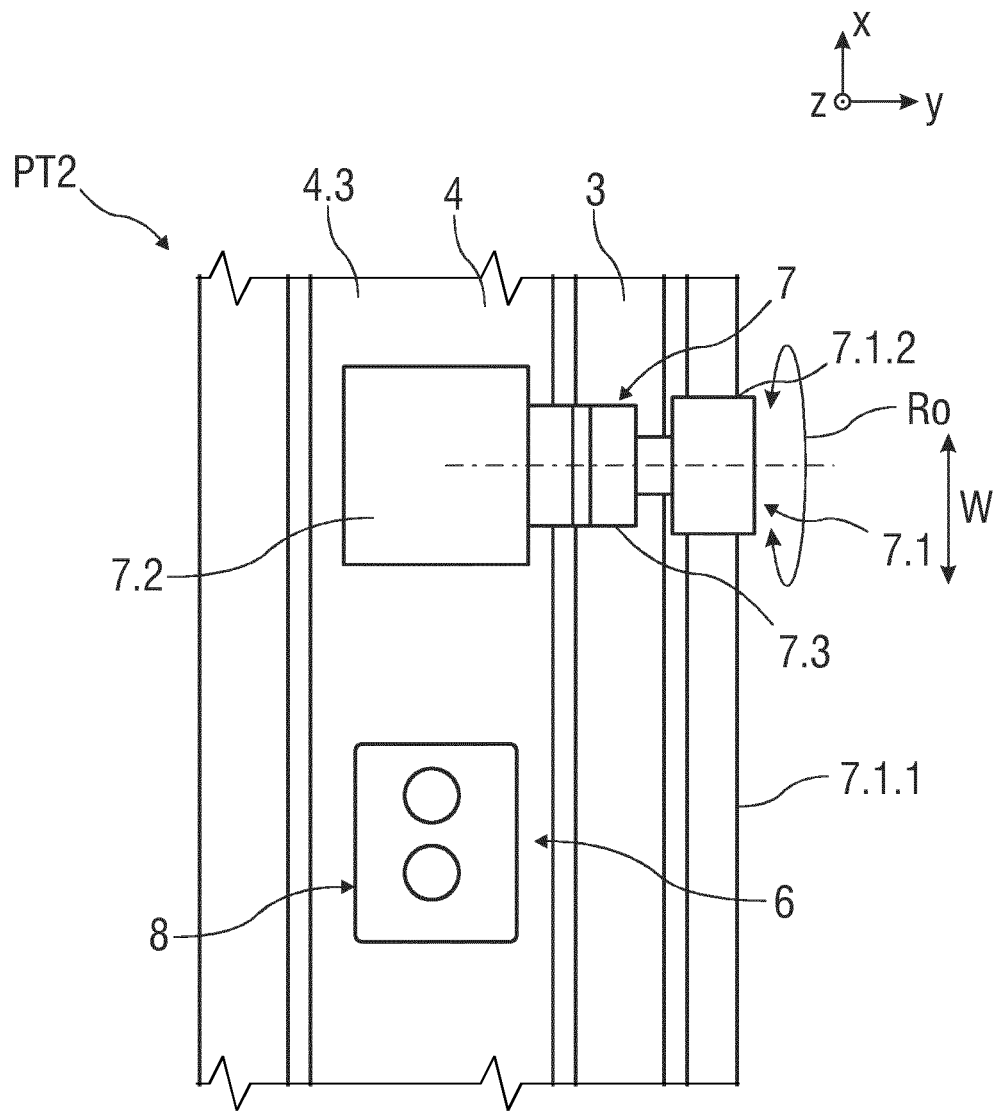
FIG. 2B shows a top view of at least a section of an embodiment of the longitudinal adjuster, particularly of one pair of tracks.
Figure 2C:
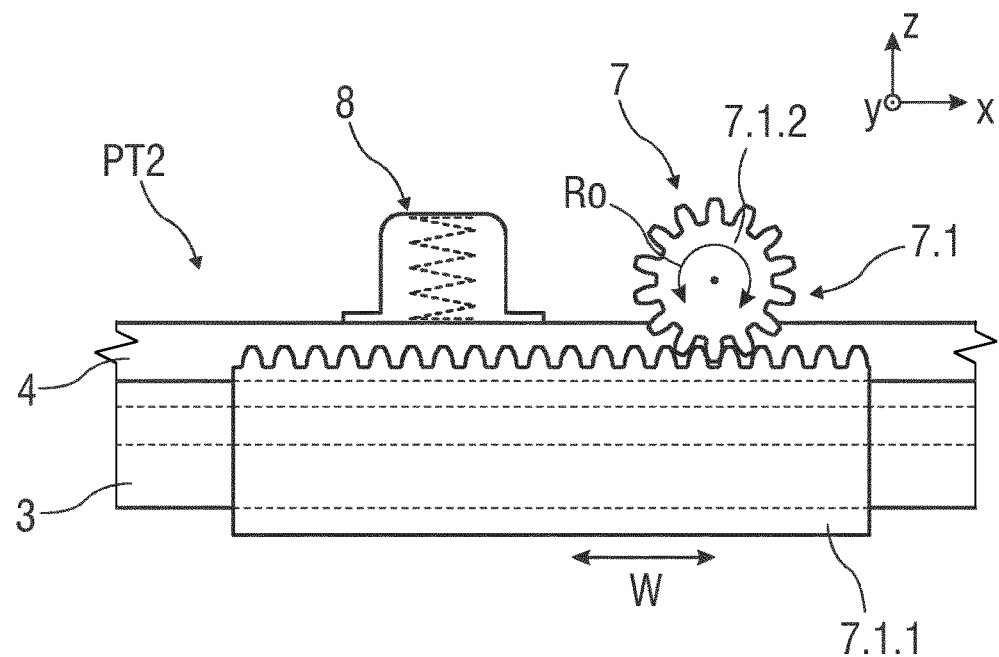
FIG. 2C shows a side view of at least a section of an embodiment of the longitudinal adjuster, particularly of one pair of tracks.

FIGS. 2A to 2C show a sectional view, top view and side view of at least a section of an embodiment of the longitudinal adjuster 2, particularly of one pair of tracks PT2. In particular, FIG. 2A shows the pair of tracks PT2 in a sectional view, FIG. 2B shows the pair of tracks PT2 in a top view and FIG. 2C shows the pair of tracks PT2 in a side view.

For instance, the latch mechanism 6 is a common latch mechanism 6. The latch mechanism 6 is arranged substantially within a track profile formed by the lower track 3 and the upper track 4. In particular, the lower track 3 and the upper track 4 are formed such that they engage alternately around each other forming the track profile. Thereby, the lower track 3 and the upper track 4 comprise substantially U-shaped profiles. In particular, the lower track 3 and the upper track 4 engage each other in their inwardly and outwardly bent lateral side portions 3.1, 4.1 forming a closed track profile and a defined assembly space AS. The assembly space AS is at least a cavity extending in the longitudinal direction of each pair of tracks PT1, PT2.

For example, the latch mechanism 6 comprises as a latch plate 6.1, a latch lever, pawl or catch. The latch plate 6.1 comprises a number of latching elements 6.2, for example projecting elements, such as teeth elements, which project from the latch plate 6.1. The latching elements 6.2 project through openings 4.2 formed in the upper track 4. The openings 4.2 are provided in the lateral side portions 4.1. The openings 4.2 extend in a vertical direction of the lateral side portions 4.1.

Further, to latch the upper track 4 to the lower track 3, the latching elements 6.2 protrude into apertures 3.2 formed in the lower track 3. The apertures 3.2 are provided in the lateral side portions 3.1, in particular in a rear region of the lower track 3 for locking the latch mechanism 6 in the rear end stop position EP1, i.e. for the use and comfort position SP1 of the seat 1. The apertures 3.2 extend in a vertical direction of the lateral side portions 3.1. In a further embodiment, these apertures 3.2 are provided in lateral side portions 3.1 of a front region of the lower track 3 for locking the latch mechanism 6 in the front end stop position EP2, i.e. for the easy-entry position SP2 of the seat 1.

In particular, the latch mechanism 6 is arranged movable within the track profile. In the shown embodiment, the latch mechanism 6 is arranged in a vertical movable manner. For example, the latch mechanism 6 is arranged within the assembly space AS. In particular, the latch plate 6.1 is arranged horizontally in the assembly space AS. By moving the latch plate 6.1 in downward direction, the latching elements 6.2 are released from the apertures 3.2 of the lower track 3. In a latched state of the latch plate 6.1, said latch plate 6.1 is in an upper vertical position, indicated as latch position LP and also shown in FIG. 3. In a released state of the latch plate 6.1, said latch plate 6.1 is in a lower vertical position, indicated as release position RP and also shown in FIG. 3.

The electromechanical device 8 is arranged on the upper track 4 and is directly coupled to the latch mechanism 6. For instance, the electromechanical device 8 is arranged on a top surface 4.3 of the upper track 4 and above the latch mechanism 6. The top surface 4.3 connects the lateral side portions 4.1, forming the U-shaped upper track 4.

The latch mechanism 6 comprises an actuating pin 6.3, rod or bolt. The actuating pin 6.3 is guided through a top opening 4.4 formed in the top surface 4.3 of the upper track 4. The actuating pin 6.3 is connected to the electromechanical device 8 and so connected to the upper track 4.

The electromechanical device 8 is configured as a solenoid having at least one electromagnetic actuator 8.1 to bias the latch mechanism 6 in one direction and at least one spring element 8.2 to bias the latch mechanism 6 in an opposite direction. Depending on a linear, vertical movement of the electromagnetic actuator 8.1 when power is applied, the spring element is either a pressure spring or a tension spring to bias the electromagnetic actuator 8.1 in one of an opposite direction, when power is interrupted. For example, the electromagnetic actuator 8.1 comprises a plunger which is vertical displaceable by electromagnetic force. The electromagnetic force is initiated by applying power to the electromechanical device 8. When power is interrupted, the electromagnetic force is switched off, whereby spring force will return the electromagnetic actuator 8.1 to its initial position.

In the shown embodiment, the electromagnetic actuator 8.1 is configured to push, i.e. in a downward direction, the latch mechanism 6 from the latch position LP to the release position RP, when power is applied. The spring element 8.2 is configured to pull, i.e. in an upward direction, the latch mechanism 6 from the release position RP to the latch position LP, when power is interrupted.

By actuating the electromechanical device 8, the electromagnetic actuator 8.1 is biased in a vertical direction while simultaneously biasing, i.e. pushing, the actuating pin 6.3 of the latch mechanism 6 in the downward direction. It is to be mentioned, that the electromechanical device 8 and the latch mechanism 6 can be configured and operated as a clutch device.

The rack and pinion drive 7.1 of the adjustment device 7 comprises a toothed rack 7.1.1 which is relatively fixed to the lower track 3 and a pinion 7.1.2 which is relatively fixed to the upper track 4.

For instance, the toothed rack 7.1.1 extends partially along a length of the lower track 3. In particular, the toothed rack 7.1.1 is arranged extending substantially parallel to lateral side portions 3.1, 4.1 of the tracks 3, 4. The pinion 7.1.2 is configured to be power driven, engaging the toothed rack 7.1.1 to move along in a longitudinal direction. Thereby, the upper track 4 is moved relative to the lower track 3 following the powered movement of the pinion 7.1.2.

In particular, the clutch unit 7.3 is arranged between and coupling the driving unit 7.2 and the pinion 7.1.2 for connecting or disconnecting the driving unit 7.2 to or from the pinion 7.1.2.

To displace the seat 1 from the use and comfort position SP1 to the easy-entry position SP2, the electromechanical device 8 is actuated, for instance via an operating element. Power or current is applied to the electromechanical device 8, whereas the electromagnetic actuator 8.1 is actuated to actively push the latch mechanism 6 from the latch position LP to the release position RP. Upon a detected release of the latch mechanism 6, the clutch unit 7.3 is actuated to engage the driving unit 7.2 and the pinion 7.1.2. Thereby, the driving unit 7.2 is actuated to move the upper track 4 in a forward direction against the end stop 10. When the end stop 10 is contacted the driving unit 7.2 stops driving. Upon a detected arrival of the upper track 4 at the front end stop position EP2, the electromagnetic actuator 8.1 is released. That means the power or current applied to the electromechanical device 8 is interrupted. Thereby, the spring element 8.2 pulls the latch mechanism 6 upwards such that the latch plate 6.1 presses against the lateral side portions 3.1 of the lower track 3. Additionally or optionally, the apertures 3.2 for locking the latching elements 6.2 are also provided in the front region of the lower track 3, whereas the latch mechanism 6 is biased to the latch position LP in the front end stop position EP2 of the upper track 4. The seat 1 is in the easy-entry position SP2.

Figure 3:
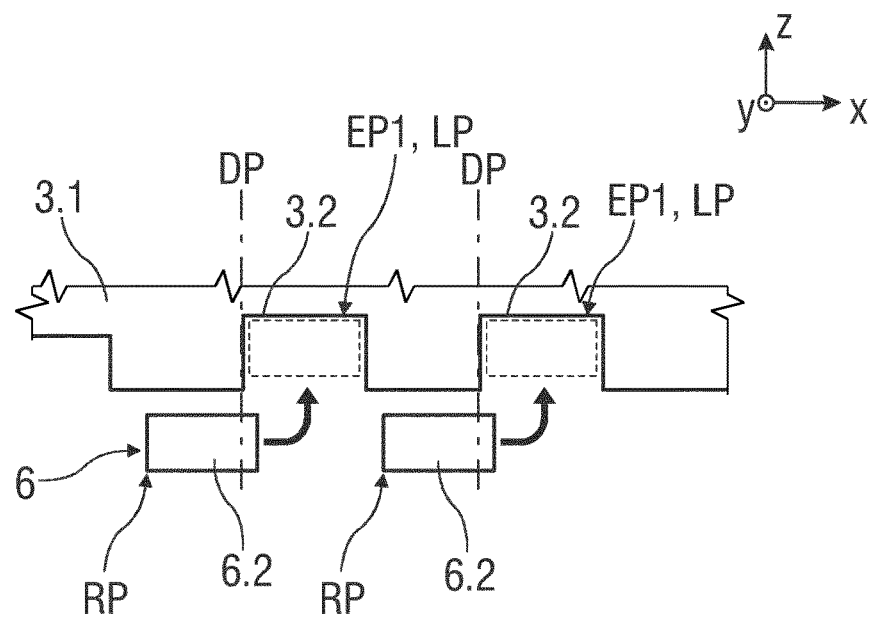
FIG. 3 shows a side view of an embodiment of a latch mechanism of the longitudinal adjuster.

To displace the seat 1 from the easy-entry position SP2 to the use and comfort position SP1, the electromechanical device 8 is actuated, in particular powered again. Thereby, the electromagnetic actuator 8.1 pushes the latch mechanism 6 downwards again. Upon a detected actuation of the electromechanical device 8, the clutch unit 7.3 is actuated to engage the driving unit 7.2 and the pinion 7.1.2. Thereby, the driving unit 7.2 is actuated to rotate the pinion 7.1.2 in reverse direction. The possible rotation directions of the pinion 7.1.2 are indicated by the arrow Ro in FIGS. 2A to 2C. The upper track 4 is moved back in a rearward direction till a designated position DP, shown in FIG. 3, is reached. The designated position DP is a predefined position of the latch mechanism 6, in particular with regard to its latching elements 6.2. Particularly, the designated position DP is a position in front of the latch position LP of the latch mechanism 6. When the latch mechanism 6, in particular its latching elements 6.2 and/or latch plate 6.1, reaches the predefined designated position DP, this taken position of the latch mechanism 6 is communicated via the control unit 9 to a power supply of the electromechanical device 8. Upon detecting the latch mechanism 6 being in the designated position DP, the applied power to the electromechanical device 8 is switched off or is rather interrupted. Thereafter, the electromagnetic actuator 8.1 is turned off, whereas the spring element 8.2 is enabled to pull the latch mechanism 6 to the latch position LP. The driving unit 7.2 is configured to continue driving, for example a predefined distance, after the designated position DP had been detected and to stop driving, when the latch mechanism 6 is biased to the latch position LP in the rear end stop position EP1 of the upper track 4. The seat 1 is in the use and comfort position SP1.

FIG. 3 shows a side view of an embodiment of the latch mechanism 6 of the longitudinal adjuster 2. In particular, the latch mechanism 6 is in the designated position DP in which the electromechanical device 8 is powered off such that the latch mechanism 6 can be self-acting biased to its latch position LP.

Figure 4A:
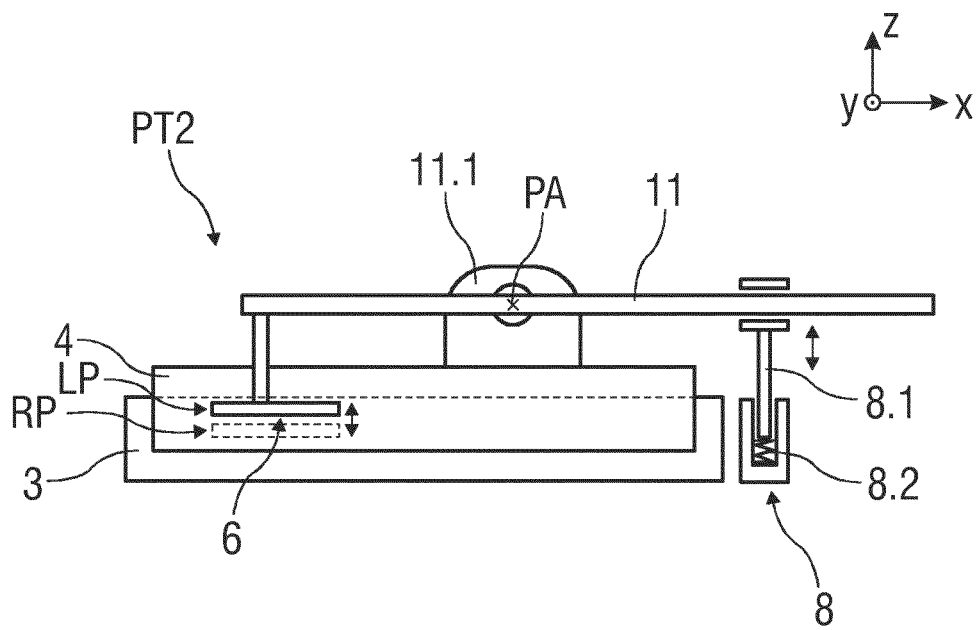
FIG. 4A shows a side view of another embodiment of the longitudinal adjuster, particularly of one pair of tracks.
Figure 4B:
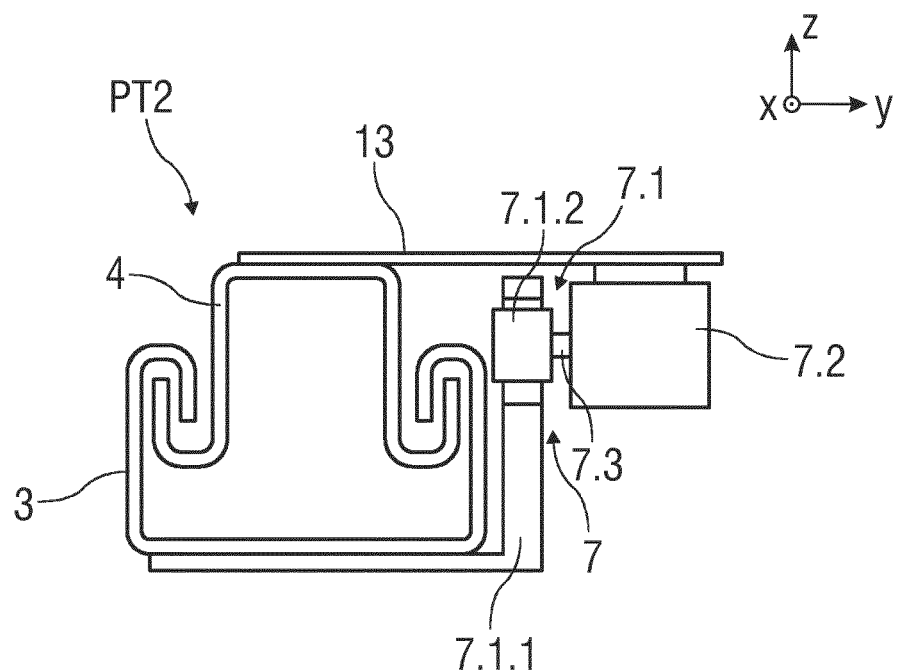
FIG. 4B shows a sectional view of another embodiment of the longitudinal adjuster particularly of one pair of tracks.

FIGS. 4A and 4B show a side view and a sectional view of another embodiment of the longitudinal adjuster 2, particularly of one pair of tracks PT2.

In the shown embodiment, the electromechanical device 8 is arranged distanced from the upper track 4, wherein the electromechanical device 8 is coupled to the latch mechanism 6 via a towel bar 11. The towel bar 11 is moved around a pivot axis PA which is arranged on the upper track 4. The towel bar 11 is connected to a towel bar bracket 11.1 fixedly arranged on an upper surface of the upper track 4. When the electromechanical device 8 is actuated, whereas power is applied, the electromagnetic actuator 8.1 pushes the towel bar 11 in an upward direction such that another end of the towel bar 11 which is connected to the latch mechanism 6 is moved downwards. Thereby, the latch mechanism 6 is biased from its latch position LP to the release position RP. Thereafter, the upper track 4 is released to be displaced relative to the lower track 3. To bias the latch mechanism 6 from the release position RP back to the latch position LP, power applied to the electromechanical device 8 is interrupted. The electromechanical device 8 returns into its default position. Thereby, the spring element 8.2 pulls the towel bar 11 in a downward direction, whereas the latch mechanism 6 is pulled in an upward direction from the release position RP to the latch position LP. For example, a packaging space is improved.

In FIG. 4B, the driving unit 7.2 is relatively coupled to the upper track 4. In particular, the driving unit 7.2 is arranged laterally distanced from the tracks 3, 4. Particularly, the driving unit 7.2 is coupled to the upper track 3 via a bar 12, rod or the like to move with the pinion 7.1.2 and with the upper track 4 in longitudinal direction. For example, a mounting bracket 13 for coupling the driving unit 7.2 to the upper track 4 is coupled with one end to the upper surface of the upper track 4, wherein another end of the mounting bracket 13 extends in a vertical manner providing a mounting area for the driving unit 7.2. For instance, the driving unit 7.2 is arranged in a space between the two pairs of tracks PT1 and PT2. Thereby, a packaging space can be improved. Further, the driving unit 7.2 is protected from external influences.

LIST OF REFERENCES 1 seat
1.1 seat pan
1.2 backrest
2 longitudinal adjuster
3 track, lower track
3.1 lateral side portion
3.2 aperture
4 track, upper track
4.1 lateral side portion
4.2 opening
4.3 top surface
4.4 top opening
5 mounting rod
6 latch mechanism
6.1 latch plate
6.2 latching element
6.3 actuating pin
7 adjustment device
7.1 rack and pinion drive
7.1.1 toothed rack
7.1.2 pinion
7.2 driving unit
7.3 clutch unit
8 electromechanical device
8.1 electromagnetic actuator
8.2 spring element
9 control unit
10 end stop
11 towel bar
11.1 towel bar bracket
12 bar
13 mounting bracket
AS assembly space
DP designated position
EP1, EP2 end stop position
PA pivot axis
PT1, PT2 pair of tracks
Ro arrow, in particular indicating rotation directions
RP release position
LP latch position
SP1, SP2 position
TA track arrangement
W travel path
x longitudinal axis
y transverse axis
z vertical axis

The invention claimed is:

1. A longitudinal adjuster for a vehicle seat, comprising:
a fixed lower track and
an upper track slidable coupled to the lower track,
wherein the upper track and lower track coupled together form a pair of rails,
an adjustment device for longitudinally adjusting the upper track relative to the lower track,
wherein the adjustment device comprises a rack and pinion drive arranged laterally to the pair of rails and at least partially along a longitudinal length of the tracks,
a latch mechanism to latch the upper track relative to the lower track, wherein the latch mechanism has a pin and a latch plate,
wherein the latch plate extends entirely across the upper track and at least partially across the lower track,
wherein the latch plate is adapted to selectively engage with recesses in the lower track,
wherein the adjustment device further comprises a driving unit located above the upper rail and laterally centered on the upper rail and adapted to power the rack and pinion drive,
wherein the adjustment device further comprises a clutch unit to connect or disconnect the driving unit and the rack and pinion drive upon release or latching of the latch mechanism,
an electromechanical device coupled to the latch mechanism,
wherein the electromechanical device is configured to bias the latch mechanism between a release position and a latch position, and upon release of the latch mechanism the adjustment device is actuated to drive the upper track relative to the lower track.

2. The longitudinal adjuster according to claim 1, wherein the electromechanical device is configured to bias the latch mechanism from the release position to the latch position when the latch mechanism and/or the upper track arrive/s at a designated position.

3. The longitudinal adjuster according to claim 1, wherein the adjustment device is configured to stop driving when the latch mechanism and/or the upper track are/is in an end stop position.

4. The longitudinal adjuster according to claim 1, wherein the electromechanical device is configured as a solenoid having at least one electromagnetic actuator to bias the latch mechanism in one direction and at least one spring element to bias the latch mechanism in an opposite direction.

5. The longitudinal adjuster according to claim 1, wherein the electromechanical device is arranged on the upper track and is directly coupled to the latch mechanism.

6. The longitudinal adjuster according to claim 1, wherein the electromechanical device is arranged distanced from the upper track, wherein the electromechanical device is coupled to the latch mechanism via a towel bar.

7. The longitudinal adjuster according to claim 1, wherein the adjustment device is configured as an external transmission device.

8. The longitudinal adjuster according to claim 1, wherein the rack and pinion drive comprises at least a toothed rack which is fixed to the lower track and a pinion which is relatively fixed to the upper track.

9. The longitudinal adjuster according to claim 1, wherein the driving unit is coupled to the upper track.

10. The longitudinal adjuster according to claim 1, wherein the adjustment device comprises a clutch unit to connect or disconnect the driving unit and the rack and pinion drive upon release or latching of the latch mechanism.

11. A vehicle seat comprising at least a seat pan, a back rest, and a longitudinal adjuster according to claim 1.

12. The vehicle seat according to claim 11, wherein the longitudinal adjuster is configured to move at least the seat pan between a use and comfort position, and an easy-entry position.

13. The longitudinal adjuster according to claim 1, wherein the upper track comprises an upper portion, two connector portions, two lower portions, and two end portions.

14. The longitudinal adjuster according to claim 13, wherein the latch plate extends beyond each of the end portions.

15. A longitudinal adjuster for a vehicle seat, comprising:
a first fixed lower track and
a first upper track slidable coupled to the first lower track, wherein the first upper track and first lower track coupled together form a first pair of rails,
a second pair of rails comprising a second fixed lower track and a second upper track slidable coupled to the second lower track,
an adjustment device coupled to the first pair of rails for longitudinally adjusting the upper tracks of the first pair of rails and second pair of rails relative to the lower tracks of the first pair of rails and second pair of rails, respectively,
wherein the adjustment device comprises a rack and pinion drive that is located laterally between the first pair of rails and second pair of rails,
wherein the rack and pinion drive comprises a pinion that is coupled to the first upper track,
wherein the adjustment device is arranged at least partially above the first pair of rails and extends at least partially along the length of the tracks,
a latch mechanism coupled to the first pair of rails to latch the first upper track relative to the first lower track,
wherein the latch mechanism has a pin and a latch plate,
wherein the latch plate extends across the entirety of the first upper track and at least partially across the first lower track,
wherein the latch plate is adapted to selectively engage with recesses in the first lower track,
wherein the adjustment device further comprises a driving unit to power the rack and pinion drive upon release of the latch mechanism,
wherein the adjustment device further comprises a clutch unit to connect or disconnect the driving unit and the rack and pinion drive upon release or latching of the latch mechanism,
wherein the driving unit is located above and laterally centered on the first pair of rails and is attached to the clutch unit,
wherein the clutch unit is attached to the driving unit and pinion and is located above the first pair of rails, and
an electromechanical device coupled to the latch mechanism,
wherein the electromechanical device is configured to bias the latch mechanism between a release position and a latch position, and upon release of the latch mechanism the adjustment device is actuated to drive the first upper track relative to the first lower track.

16. A longitudinal adjuster for a vehicle seat comprising:
a fixed lower track and
an upper track slidable coupled to the lower track,
wherein the upper track and lower track coupled together form a pair of rails,
an adjustment device coupled to the pair of rails for longitudinally adjusting the upper track relative to the lower track,
wherein the adjustment device comprises a rack and pinion drive,
wherein the rack and pinion drive comprises a toothed rack and a pinion,
wherein the adjustment device further comprises a driving unit that is coupled to the pinion via a clutch unit,
wherein the adjustment device is arranged laterally distant from the pair of rails, and
a mounting bracket that couples the driving unit, and thus the adjustment device, to the upper track,
wherein the mounting bracket runs perpendicular to a vertical axis of the pair of rails,
wherein the mounting bracket covers at least part of the upper track, the pinion, the driving unit, and the clutch unit.

17. The longitudinal adjuster according to claim 16, wherein the entirety of the mounting bracket spans above the upper track, driving unit, clutch unit, and the pinion.

* * * * *